Wm. C. Dodge, Cartridge Retractor for Revolving Fire Arms.

4483

REISSUED JUL 25 1871

Witnesses.
H. L. Bennett.
Chas. H. Yerxa

Wm C. Dodge
assignor to
Horace Smith &
D. B. Wesson
by their attorney
E. S. Renwick

AM. PHOTO-LITHOGRAPHIC CO. N.Y. (OSBORNE'S PROCESS.)

UNITED STATES PATENT OFFICE.

WILLIAM C. DODGE, OF WASHINGTON, DISTRICT OF COLUMBIA, ASSIGNOR TO HORACE SMITH AND D. B. WESSON, OF SPRINGFIELD, MASSACHUSETTS.

IMPROVEMENT IN REVOLVING FIRE-ARMS.

Specification forming part of Letters Patent No. 45,912, dated January 17, 1865; reissue No. 4,483, dated July 25, 1871.

*To all whom it may concern:*

Be it known that I, WILLIAM C. DODGE, of Washington city, in the District of Columbia, made an invention of certain new and useful Improvements in Fire-arms, of which the following is a full, clear, and exact description and specification, reference being had to the accompanying drawing making part of this specification and to the letters of reference marked thereon, which several figures will be hereinafter explained.

Similar letters indicate corresponding parts in each of the figures.

The invention relates to that class of fire-arms which has many-chambered cylinders constructed to revolve upon a central axis (so that each chamber may in succession be brought into the line of fire by turning the cylinder upon its axis) and adapted to be loaded with cartridges.

In such arms as constructed previous to my invention, with a cylinder of barrels, the cartridge-cases or shells are removed singly or one at a time by means of a rod or bolt, which is generally separate or detached from the fire-arm, while in the great majority of revolving-cylinder pistols having a revolving cylinder combined with a stationary barrel the cylinder has to be removed or detached from the stock or lock-frame to permit the removal of the cartridge-cases and the reloading of the arm.

It is to remedy the difficulties of or objections to such fire-arms that my invention is intended; and it consists of certain combinations of instrumentalities, of which a revolving cylinder containing chambers for cartridges and a retractor adapted to operate upon the exteriors of the cartridge-cases in the chambers of said cylinder are essential members. These combinations are specified at the close of this description.

To enable others skilled in the art to make and use the invention, I will proceed to describe the construction and operation of repeating pistols, embodying it in the best forms known to me at the date of the original application for the patent.

Figure 2:
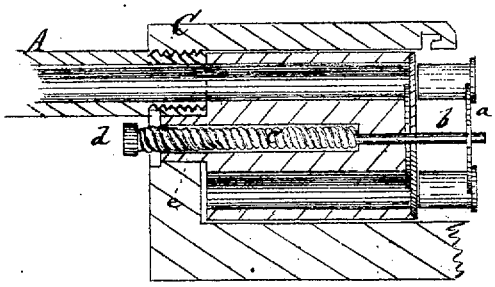
Figure 3:
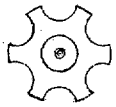

The retractor consists of a metallic plate, of any suitable form to adapt it to the arm to which it is to be applied, and which is so constructed as to fit snugly against or within that end of the cylinder in which the cartridges are inserted. It may be a single disk, as shown at *a*, Fig. 1, in which case it will be provided with perforations corresponding in number, size, and location with the chambers of the cylinder; or, it may be in the form of a "spider" or smaller disk, with portions of its periphery cut away to correspond with the chambers, as clearly shown in Fig. 3. In the former case it will fit snugly against the flat end of cylinder B when in place; in the latter case the end of the cylinder will be so recessed as to cause the outer face of the retractor *a* to be flush with the surface of the end of the cylinder, as shown in Figs. 2 and 3. This retractor *a* is provided with a central stem passing into or through a hole bored longitudinally in the center of the cylinder. This stem *b* is clearly shown in Fig. 2, and its office is to support the retractor *a* and guide it in its operation. Upon this stem *b* is usually mounted a spiral spring, *c*, for the purpose of automatically returning the retractor *a* to its position when it has been pushed or drawn outward for the removal of the cartridge-cases.

The invention may be applied to a revolving-cylinder fire-arm having its parts so arranged that the revolving cylinder may be loaded at its front end, or to one having its parts so arranged that the revolving cylinder may be loaded at its rear end.

Figure 1:
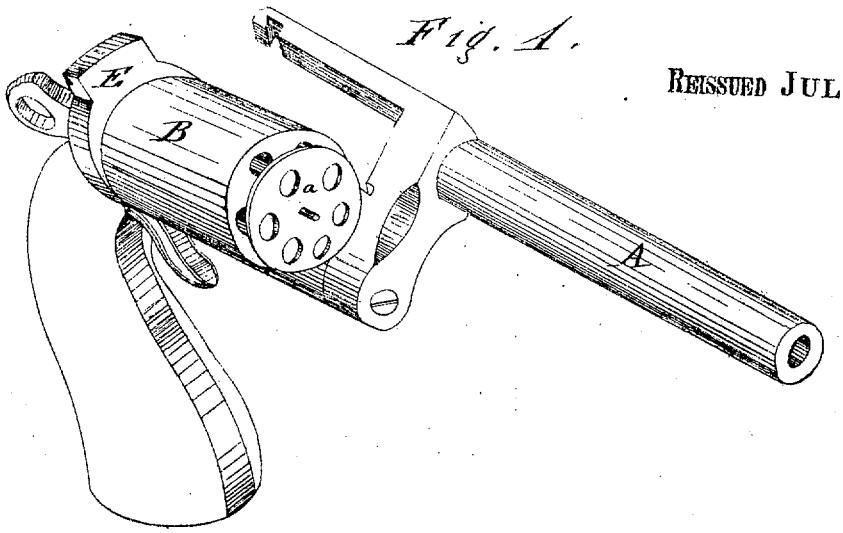

Fig. 1 is a perspective view of a revolver embodying the invention and with the revolving cylinder B constructed to be loaded at its front end. In order to permit the ready application and use of the invention the barrel A is so hinged or pivoted to the lock-frame that the barrel can be swung to one side out of the way of the retractor *a*, as clearly shown. In this case the revolving cylinder B is secured in any suitable manner to the recoil-plate E or rear portion of the frame. The stem *b* of the retractor may be made to protrude, as in Fig. 2, but at the rear instead of the front end of the cylinder, or it may be incased within the cylinder. Fig. 2, which is a longitudinal vertical section of a portion of the barrel and frame of a revolver with its cylinder B attached to the frame by an axis or journal, *e*, which permits it to revolve, shows the retractor *a* with its stem *b* and spring *c* applied, with the end of the stem protruding from the front of the cylinder. This method of applying it enables the retractor *a* to be operated by pressing against the end of the stem *b* or the nut *d* thereon, as clearly shown. This figure represents the invention applied to a cylinder which is loaded in the usual manner at its rear end. In such fire-arms the frame C, with the barrel A and cylinder B attached thereto, is to be so pivoted or hinged to the lock-frame that the former can be swung round or moved so as to bring the rear end of the cylinder clear of the recoil-plate E or other portions of the frame or stock. This, however, is only necessary in those cases where it is desired to operate the retractor without detaching the cylinder from the frame. It is obvious that the retractor may be applied to all cylinders which are to be detached from the frame without thus hinging or pivoting the parts. In all cases in which the retractor is constructed with perforations or with recesses the stem *b* of the retractor may be provided with a feather and its seat with a corresponding groove, which will so guide the retractor-plate *a* in its return, after having been shoved or drawn out, as to cause its perforations or recesses to exactly coincide with the chambers of the cylinder; or any other mechanical device may be used, if desired, for the same purpose—as, for instance, one or more pins or studs may be screwed to the under or inner surface of the retractor *a*, and made to work in corresponding holes in the revolving cylinder, or in grooves in the side thereof. It is also obvious that, instead of the central stem *b*, two or more stems may be attached to the retractor *a* near its outer edges, and made to work in corresponding grooves or holes in or near the periphery of the revolving cylinder. It is also further obvious that the retractor *a* may be made in two or more parts, and so applied as to move but a portion of the cartridge-cases at a time; but that would be but a modification of my invention, and one which I do not deem desirable, as it might increase the number of parts, and, consequently, the cost of construction, and would, at the same time, lessen the rapidity of operation of the retractor, as all the cartridge-cases would not be withdrawn simultaneously. In case the retractor has the form of a perforated disk, *a*, as shown in Fig. 1, its periphery may be "milled" or otherwise roughened, or proper recesses may be cut in the sides of the revolving cylinder at the end where the disk *a* is applied for convenience in grasping it when it is desired to operate it by drawing instead of pushing it out.

The operation is very simple, so much so as scarcely to require further explanation. After the arm has been discharged the revolving cylinder is so moved in relation to the other parts of the arm as to expose its end containing the cartridge-cases, when, by either pushing or drawing the retractor *a* outward, all the cases, whatever their number, may be simultaneously and instantly ejected from the arm. By this means the arm is instantly prepared for reloading, with the least possible loss of time, without detaching any of its parts from the frame or stock and without the use of any separate rod, bolt, or other part for that purpose.

The advantages to be derived from this improvement in revolving fire-arms are manifold. In the first place, as revolving arms were constructed previous to this invention the soldier or person using them is not able on any occasion to discharge them more times than they contain loads, for the reason that the process of removing the cartridge-cases is so slow and tedious, and for the further reason that the cylinder has generally to be detached entirely from the arm and some separate device used for the removal of the cartridge-cases. So great is the difficulty of performing this operation in the case of mounted men, who more than all others use revolving arms, and so imminent is the danger of losing or dropping some of the detached parts that usually in battle no effort is even made to reload the arm after it has been once emptied of its charges; and in case the arm is to be used in the dark, as often happens both with soldiers and civilians, the difficulties here mentioned are greatly increased, whereby valuable lives are oftentimes lost, and the efficiency of the arm greatly lessened. By the invention which constitutes the subject of this patent all these difficulties are at once removed, the efficiency and value of the arm largely increased, and that, too, without adding materially to its weight, bulk, or expense. The invention is simple, readily constructed, not easily injured or disarranged, and does not interfere in the least with the compactness or beauty of the arm.

The invention is not limited to the mechanical details or devices hereinbefore described, as it is obvious that they may be greatly varied or others substituted without departing from the spirit of the invention.

On the other hand, I do not claim the invention of a revolving cylinder or chambers, or of a revolving cylinder of barrels having chambers at their rear ends, nor the combination of a retractor with two or more stationary barrels or chambers; but

What I claim as my invention, and desire to secure by Letters Patent, is—

1. The combination of the chambered cylinder, connected with the frame of the fire-arm by means of the journal, or its equivalent, that permits said cylinder to be revolved on its axis, and the retractor with its stem, adapted to withdraw several cartridge-cases simultaneously from said cylinder, the whole constructed and arranged substantially as described.

2. The combination of a single barrel, a revolving-chambered cylinder connected to the frame by a journal or its equivalent, and a retractor with its stem adapted to operate upon the exterior of the cartridge-cases and withdraw them from said cylinder, the whole constructed and arranged substantially as set forth.

3. The combination of the revolving-chambered cylinder-retractor, retractor-stem, and retractor-spring, the whole constructed and arranged substantially as before set forth.

4. The combination of the revolving-chambered cylinder and retractor, with a retractor-stem extending through said cylinder and projecting therefrom so as to be operated from the end of the cylinder opposite that at which the retractor is arranged, the whole constructed and arranged substantially as before set forth.

5. The combination of the revolving-chambered cylinder, retractor, lock-frame, and hinge-pivot, whereby the end of the cylinder may be uncovered to permit the cartridge-cases to be retracted from the revolving cylinder without disconnecting it from the lock-frame, the whole constructed and arranged substantially as set forth.

In testimony whereof I have hereto set my hand.

WILLIAM C. DODGE.

Witnesses:
PHIL. T. DODGE,
J. MCKENNEY.